(12) United States Patent
Jami et al.

(10) Patent No.: US 8,891,361 B2
(45) Date of Patent: Nov. 18, 2014

(54) METHOD OF TRANSFER OF A CALL CONNECTION CONNECTING A TELECOMMUNICATIONS BASE STATION AND A MOBILE USER TERMINAL BETWEEN DEDICATED AND SHARED CHANNELS, AND A CORRESPONDING TELECOMMUNICATIONS SYSTEM

(75) Inventors: Iqbal Jami, Swindon (GB); Paul William Piggin, Chippenham (GB)

(73) Assignee: Alcatel Lucent, Boulogne-Billancourt (FR)

( * ) Notice: Subject to any disclaimer, the term of this patent is extended or adjusted under 35 U.S.C. 154(b) by 2628 days.

(21) Appl. No.: 10/662,917

(22) Filed: Sep. 15, 2003

(65) Prior Publication Data
US 2004/0082336 A1 Apr. 29, 2004

(30) Foreign Application Priority Data
Oct. 24, 2002 (EP) .................................... 02257398

(51) Int. Cl.
*G01R 31/08* (2006.01)
*H04W 36/06* (2009.01)
*H04W 72/00* (2009.01)

(52) U.S. Cl.
CPC .................................... *H04W 36/06* (2013.01)
USPC ........ 370/229; 370/230; 370/230.1; 370/231; 370/232; 370/233; 455/450; 455/451; 455/452.1; 455/452.2

(58) Field of Classification Search
CPC ........................................................ G01R 31/08
USPC .......................................... 370/437, 332, 229
See application file for complete search history.

(56) References Cited

U.S. PATENT DOCUMENTS 6,347,091 B1    2/2002  Wallentin et al. ............. 370/437
6,978,143 B1 *  12/2005 Vialen ........................ 455/452.2

FOREIGN PATENT DOCUMENTS

| EP | GB 2 307 142 A | 5/1997 | ............... H04Q 7/36 |
| EP | GB 2 369 003 A | 5/2002 | ............... H04Q 7/22 |
| WO | WO 02/067606 A2 | 8/2002 | ............... H04Q 7/22 |

* cited by examiner

*Primary Examiner* — Huy C Ho

(57) ABSTRACT

A method is provided of transfer of a call connection connecting a telecommunications base station and a mobile user terminal between dedicated channels in both directions therebetween and shared channels in both directions therebetween. The transfer is made dependent upon the amount of data buffered at the base station and the user terminal for transmission therebetween and/or the rate that data arrives at the base station and user terminal for transmission therebetween. The transfer is also dependent upon the value of a measured parameter of the signals between the base station and the user terminal, the parameter being signal attenuation or propagation delay.

14 Claims, 1 Drawing Sheet

METHOD OF TRANSFER OF A CALL CONNECTION CONNECTING A TELECOMMUNICATIONS BASE STATION AND A MOBILE USER TERMINAL BETWEEN DEDICATED AND SHARED CHANNELS, AND A CORRESPONDING TELECOMMUNICATIONS SYSTEM

CROSS REFERENCE TO RELATED APPLICATION

This application claims priority of European Application No. 02257398.4 filed on Oct. 24, 2002.

TECHNICAL FIELD

The present invention relates to wireless communication, and more particularly, to transfer of a call connection connecting a telecommunications base station and a mobile user terminal between dedicated channels in both directions therebetween and shared channels in both directions therebetween.

BACKGROUND OF THE INVENTION

In the case of data services, a mandatory requirement of a Universal Mobile Telecommunications System (UMTS) terrestrial radio access network (UTRAN) is to provide dedicated channels for transmission of user terminal packet data on the air interface (i.e. by radio between a base station and mobile user terminal terminals). It is given that there will be more user terminals than dedicated channel resources and so a method is required to share the available resources. One method is use of an inactivity timer. The inactivity timer monitors activity of a user terminal and deallocates dedicated resources when the period of inactivity exceeds the threshold for the inactivity timer. This behaviour gives rise to multiplexing gain. The user terminal nevertheless retains a logical connection to the Core Network and any data server to which they are connected.

Effective utilisation of dedicated channels can only be achieved when a large percentage of the time the dedicated channel is being used to transfer data. This is often not the case when small files are being transferred and the transport layer is using congestion avoidance algorithms, for example Traffic Control Protocol (TCP) with slow start. In this case, round trip delays within the network dominate the maximum transfer rate. Particularly inefficient use of the air interface and dedicated channels is observed when short periodic 'keep alive' messages are being sent between client and server, as occurs for some application types. Such traffic involves the establishment of a dedicated channel, the transmission of a small amount of data, and the activity timer to expire before the channel can be released. The inactivity timer duration exacerbates the problem of user data being sent for only a small proportion of the time (i.e. a low duty cycle) when using dedicated channels.

A potential solution to this problem is to use signalling channels to transmit data. Termed the Forward Access CHannel (FACH) and Reverse Access CHannel (RACH), these common channels possess the advantage of carrying short, bursty (i.e. low duty cycle) traffic more efficiently over the air interface. This has the closely associated benefit of good (i.e. low) signalling behaviour, as dedicated channels are not regularly being set up and torn down. Another benefit is low channelisation code usage, the maximum number of codes usable at any one time is a significant limitation for system performance in high data rate cases.

Currently the parameters used to decide when a user terminal terminal is to transition to and from the state where data is sent over the signalling channels is based on the prevailing data activity for that user terminal terminal (i.e. data rate and buffer occupancy).

The transport of user data, together with signalling for air interface management, over the FACH/RACH channels results in a significant increase in the time for which the FACH/RACH channels are in use (i.e. FACH/RACH duty cycles). In systems where the FACH channel is not power controlled, the transmit power (from the base station) for the FACH needs to be at such a level that it reaches the edge of the cell, regardless of the location of the mobile user terminal terminals. In addition, the proportion of the time for which the RACH channel is in use (i.e. the RACH duty cycle) will naturally also increase resulting in a increase in the uplink loading. The RACH channel also has no fast power control and so with fast fading can reduce the performance of the base station receiver.

In addition, for Acknowledged Mode services, data transmission on a FACH/RACH channel pair involves large number of acknowledgements being transmitted as part of the Radio Link Control (RLC) behaviour. The RLC is a so-called layer 2 protocol and provides reliable data transfer. Depending on a user terminal terminal's traffic profile there is a certain amount of interference in both uplink and the downlink directions (i.e. to and from the base station) due to the additional acknowledgement messages.

The FACH/RACH solution is intended for 'bursty', low volume data transfer, while the dedicated channel is intended for high-volume constant data transfer. When a user terminal is sending or receiving data on the FACH/RACH channels, it is intended that as data volume increases, the user terminal moves from the FACH/RACH channels to the dedicated channel state. Metrics (i.e. measurements are made and used to determine when a user terminal terminal should transition from one state to another, specifically monitoring data rate and buffer occupancy for a given user terminal terminal.

SUMMARY OF THE INVENTION

An embodiment of the present invention provides a method of transfer of a call connection connecting a telecommunications base station and a mobile user terminal between dedicated channels in both directions therebetween and shared channels in both directions therebetween, in which the transfer is made dependent upon the amount of data buffered at the base station and the user terminal for transmission therebetween and/or the rate that data arrives at the base station and user terminal for transmission therebetween, and also dependent upon the value of a measured parameter of the signals between the base station and the user terminal, the parameter being signal attenuation or propagation delay.

In embodiments of the invention, an indicator of radio frequency (RF) power required is considered in addition to user data rate and buffer occupancy to make a decision to transition to and from the 'data over RACH/FACH state'. Hence additional information is provided as input to the decision making when transit to or from the 'data over FACH/RACH' state. Propagation delay or signal attenuation (i.e. pathloss) values give an indication of the RF power required. Measurements of these parameters related RF power are made and used in making a decision whether to transit a call connection with a mobile terminal from one packet data transmission state to another. This is of particular benefit in the case where there is no power control for the FACH/RACH channel pair.

Advantages of embodiments of the present invention include less base station power usage for a call connection, and less signal interference in consequence. Use is improved of RF power for packet data transmission on shared channels, particularly those without power control.

In these embodiments, for a shared channel call connection, upon the parameter value being determined as being less than a predetermined threshold, transfer is made to dedicated channels; and for a dedicated channel call connection, upon the parameter value being determined as being more than a predetermined threshold, transfer is made to shared channels. The transfer is made also dependent upon whether or not the shared channels operate such that an acknowledgement of receipt is sent on receiving data.

In these embodiments, the shared channels are a Random Access Channel (RACH) and a Forward Access Channel (FACH), the base station comprises a radio network controller, and the base station and user terminal operate to transfer the call connection in accordance with the Universal Mobile Telecommunication System (UMTS) standard.

An embodiment of the present invention is also a corresponding telecommunications system.

BRIEF DESCRIPTION OF THE DRAWINGS

An embodiment of the present invention will now be described by way of example and with reference to the drawings, in which.

DETAILED DESCRIPTION

Figure 1:
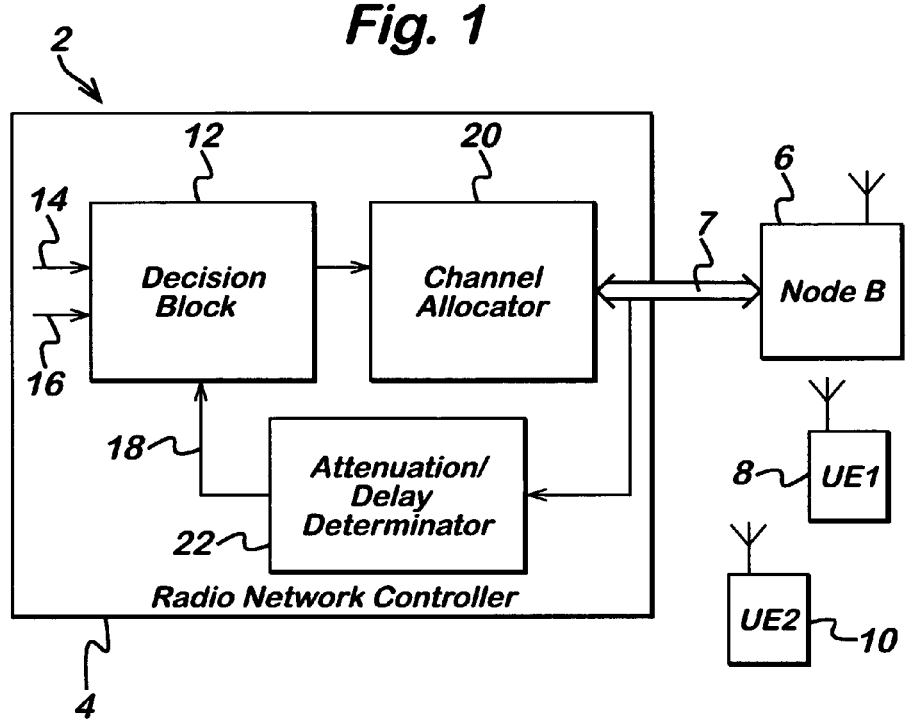
FIG. 1 is a diagram illustrating.

As shown in FIG. 1, a UMTS mobile telecommunications system 2 includes radio network controllers 4 (one of which is shown in FIG. 1 for simplicity) each connected to base stations 6 (one of which is shown in FIG. 1 for simplicity, Node B in UMTS terminology) by an interface known as an IuB interface 7. Each base station 6 has an associated cell i.e. area of radio coverage such that active mobile user terminals 8,10 within the cell are in call connection with the base station 6 under the control of the associated radio network controller 4. Each radio network controller 4 comprises a decision block 12 operative to determine when a call connection with a mobile user terminal should be switched from, on the one hand, an uplink (i.e. to the base station) channel dedicated to that mobile user terminal and a downlink (i.e. from the base station) channel dedicated to that mobile user terminal to, on the other hand, uplink and downlink channels shared with other mobile user terminals, namely the Forward Access Channel (FACH) uplink and the Reverse Access Channel (RACH) downlink. The decision block 12 operates by considering weighted factors representing the level of occupancy of buffers for traffic between the radio network controller and the mobile user terminal and data rate in both directions between the base station and the mobile user terminal. Signals representing the level of buffer occupancy are provided as an input 14 to the decision block. Signals representing the level of data rate are provided as an input 16 to the decision block.

In addition to input data rate and buffer occupancy, the radio frequency transmission power requirement is also considered as a factor in deciding when to transit to or from a data over RACH/FACH state. Accordingly the decision block 12 has an input 18 for a signal related to the RF power requirement of channels for call connection to a mobile user terminal 8,10.

The RF power required is determined (in an attenuation/delay determinator 22) by either (a) measurement of signal attenuation (i.e. pathloss) or (b) by using measurements of propagation delay, which is related to pathloss, of course, in the sense that signals travelling shorter distances experience less attenuation. The RF power level is then set (or adjusted) dependent on these measured values. In either case the measurements are made to determine which user terminal terminals require lower base station transmit powers. In (a) attenuation is determined by measurement of the amplitude (or intensity) of signals received by a mobile user terminal, those measurements being reported back to the base station 6 and forwarded on to the radio network controller 4. In (b) time for transmission from base station 6 to mobile user terminal is determined by reporting back the time of reception at the mobile user terminal to the base station 6 and forwarding that information to the radio network controller 4.

The decision block 12 of the radio network controller 4 acts to control a channel allocator operative to allocate to a call connection either RACH/FACH (i.e. shared or common) uplink and downlink channels, or dedicated uplink and downlink channels.

Figure 2:
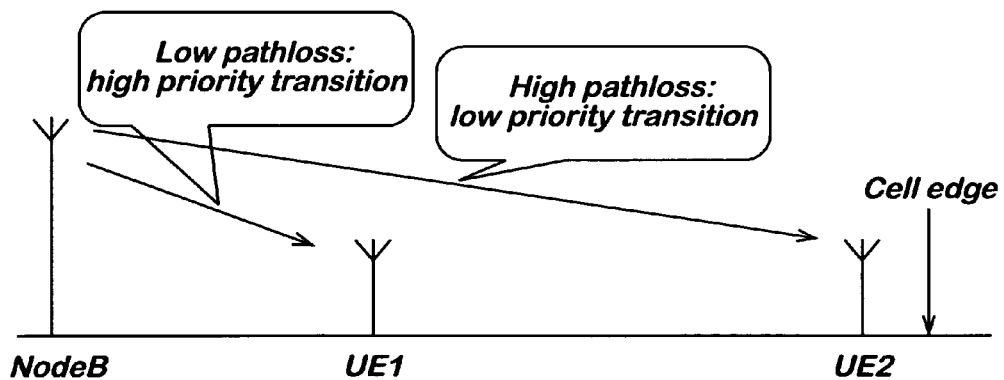
FIG. 2 is a diagram illustrating the distinction between user terminals' priority in transiting from the 'data over FACH/RACH state'.

Referring to FIG. 2, user terminals requiring sufficiently low powers, such as user terminals who are determined as being close by due to the low propagation delay or signal attenuation measured in sending signals to them, are transitioned to the dedicated channel state. These user terminals are transitioned because they do not need such high transmit powers. One such user terminal is shown in FIG. 2 denoted as UE1.

Transition to the dedicated channel state results in those user terminals being fast power controlled, which makes efficient use of base station power and hence reduces interference. User terminals at the cell edge would be using larger powers, due to their location, and so it is advantageous for them to remain in the 'data over FACH/RACH state' which does not have fast power control to benefit from the advantages of this state in terms of the efficient usage of resources as mentioned previously. One such terminal is shown in FIG. 2 denoted as UE2.

(In FIG. 2 the base station is denoted Node B in accordance with UMTS terminology)

In a further embodiment, which is a telecommunication system as shown in FIG. 1 but with a further input (not shown) to the decision block 12, if transition to a common channel state from a dedicated channel state is being considered, then the possible increase in (Radio Link Control (RLC)) acknowledgements in the FACH/RACH state is considered. The further input (not shown) receives a signal indicating whether or not acknowledgements are required to be received back before data is assumed to have been correctly received. If the FACH/RACH channel state is in Acknowledge mode (i.e. acknowledgements being required), more traffic will result so remaining in the dedicated state will be relatively more favourable.

The invention claimed is:

1. A method of transfer of a call connection connecting a telecommunications base station and a mobile user terminal between dedicated channels in both directions therebetween and shared channels in both directions therebetween, comprising:

determining amount of data buffered at the base station and the user terminal for transmission therebetween and/or rate that data arrives at the base station and the user terminal for transmission therebetween;

determining a value of a measured parameter of signals between the base station and the user terminal, the parameter being signal attenuation or propagation delay; and determining whether or not the shared channels are in a mode in which an acknowledgement of receipt is required to be received back before data is assumed to have been correctly received;

deciding to make the transfer, dependent upon said value and upon said amount or rate, and upon said mode determined.

2. A method of transfer of a call connection according to claim 1, in which for a shared channel call connection, upon the parameter value being determined as being less than a predetermined threshold, transfer is made to dedicated channels.

3. A method of transfer of a call connection according to claim 1 or claim 2, in which for a dedicated channel call connection, upon the parameter value being determined as being more than a predetermined threshold, transfer is made to shared channels.

4. A method of transfer of a call connection according to claim 1, in which the shared channels are a Random Access Channel (RACH) and a Forward Access Channel (FACH), the base station comprises a radio network controller, and the base station and user terminal operate to transfer the call connection in accordance with the Universal Mobile Telecommunication System (UMTS) standard.

5. A telecommunications system comprising a base station and a mobile user terminal, the base station and the user terminal being in use in call connection over dedicated channels or shared channels, the base station comprising decision means, a channel allocator, and a processor, the decision means being operative to control transfer of the call connection by the channel allocator between the dedicated channels and the shared channels dependent upon:

a first input signal to the decision means indicating amount of data buffered at the base station and the user terminal for transmission therebetween and/or rate that data arrives at the base station and the user terminal for transmission therebetween;

a second input signal to the decision means indicating value of a measured parameter of signals between the base station and the user terminal, the parameter being signal attenuation or propagation delay, the parameter value being determined by the processor; and a third input signal to the decision means indicating whether or not the shared channels are in a mode in which an acknowledgement of receipt is required to be received back before data is assumed to have been correctly received.

6. A telecommunications system according to claim 5, in which in use, for a shared channel call connection, upon the parameter value being determined as being less than a predetermined threshold, transfer is made to dedicated channels.

7. A telecommunications system according to claim 5, in which in use, for a dedicated channel call connection, upon the parameter value being determined as being more than a predetermined threshold, transfer is made to shared channels.

8. A telecommunications system according to claim 5, in which the shared channels are a Random Access Channel (RACH) and a Forward Access Channel (FACH), the base station comprises a radio network controller and Node B, and the base station and user terminal operate to transfer the call connection in accordance with the Universal Mobile Telecommunication System (UMTS) standard.

9. A radio network controller comprising decision means, a channel allocator, and a determinator, the decision means adapted to control transfer of a call connection via the channel allocator between dedicated channels and shared channels dependent upon:

a first input signal indicating an amount of data buffered for transmission, a rate that data arrives for transmission, or both the amount of data buffered for transmission and the rate that data arrives for transmission;

a second input signal indicating a value of a parameter, the parameter being signal attenuation or propagation delay of transmitted signals, the value of the parameter being determined by the determinator; and a third input signal indicating whether or not the shared channels operate in a mode in which an acknowledgement of receipt is required to be received back before data is assumed to have been correctly received.

10. The radio network controller according to claim 9, in which, for a shared channel call connection, upon the value of the parameter being determined as being less than a predetermined threshold, the channel allocator indicates transfer is to be made to dedicated channels.

11. The radio network controller according to claim 9, in which, for a dedicated channel call connection, upon the value of the parameter being determined as being more than a predetermined threshold, the channel allocator indicates transfer is to be made to shared channels.

12. The radio network controller according to claim 9, in which the shared channels are a Random Access Channel (RACH) and a Forward Access Channel (FACH).

13. The radio network controller according to claim 9, further comprising:

a Node B, the Node B responsive to the channel allocator to transfer the call connection between dedicated channels and shared channels.

14. The radio network controller according to claim 9 wherein the call connection is transferred in accordance with the Universal Mobile Telecommunication System (UMTS) standard.

\* \* \* \* \*